(12) United States Patent
Aplemakh et al.

(10) Patent No.: US 10,211,991 B1
(45) Date of Patent: Feb. 19, 2019

(54) METHOD FOR DOWNLOADING PREAUTHORIZED APPLICATIONS TO DESKTOP COMPUTER USING SECURE CONNECTION

(71) Applicant: Parallels IP Holdings GmbH, Schaffhausen (CH)

(72) Inventors: Alexander Aplemakh, Moscow (RU); Stanislav S. Protassov, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 367 days.

(21) Appl. No.: 15/169,512

(22) Filed: May 31, 2016

Related U.S. Application Data

(62) Division of application No. 13/939,295, filed on Jul. 11, 2013, now Pat. No. 9,380,040.

(51) Int. Cl.
| | | |
|---|---|---|
| *G06F 15/16* | (2006.01) | |
| *H04L 9/32* | (2006.01) | |
| *H04L 29/06* | (2006.01) | |
| *H04L 29/08* | (2006.01) | |
| *G06F 8/61* | (2018.01) | |
| *H04W 12/06* | (2009.01) | |

(52) U.S. Cl.
CPC .............. *H04L 9/3263* (2013.01); *G06F 8/61* (2013.01); *H04L 63/0823* (2013.01); *H04L 65/1069* (2013.01); *H04L 67/104* (2013.01); *H04W 12/06* (2013.01); *H04L 2209/80* (2013.01)

(58) Field of Classification Search
CPC .............................. H04L 63/08; H04L 47/824
See application file for complete search history.

(56) References Cited

U.S. PATENT DOCUMENTS

| | | | | |
|---|---|---|---|---|
| 5,457,797 | A * | 10/1995 | Butterworth | .......... G06F 9/5027 709/226 |
| 6,571,245 | B2 * | 5/2003 | Huang | .............. G06F 17/30867 |
| 6,928,469 | B1 * | 8/2005 | Duursma | .................. G06F 9/54 709/203 |
| 7,065,637 | B1 * | 6/2006 | Nanja | ................. H04L 63/0272 713/1 |
| 7,606,868 | B1 * | 10/2009 | Le | ..................... G06F 17/30067 707/999.01 |
| 8,849,978 | B1 * | 9/2014 | Batson | ..................... H04L 67/10 709/223 |
| 2002/0133587 | A1 * | 9/2002 | Ensel | .................. H04L 12/2602 709/224 |
| 2002/0184361 | A1 * | 12/2002 | Eden | ...................... H04L 41/22 709/224 |

(Continued)

*Primary Examiner* — Arvin Eskandarnia
(74) *Attorney, Agent, or Firm* — Bardmesser Law Group

(57) ABSTRACT

A method and computer program product for establishing a connection and downloading server applications on a desktop. A user downloads and installs custom server software with the embedded user credentials data. The software provider customizes software for the user. The key of the digital signature is used as a part of the installation package. The user downloads custom server software and installs it on his desktop over a secure connection. A vendor (or content provider) checks the validity of the user data and registers the application to the user. The application provider has a right to digitally sign the package.

16 Claims, 6 Drawing Sheets

(56) References Cited

U.S. PATENT DOCUMENTS

| | | | |
|---|---|---|---|
| 2003/0195950 A1* | 10/2003 | Huang | G06F 17/30867 709/219 |
| 2004/0216058 A1* | 10/2004 | Chavers | G06F 3/0481 715/810 |
| 2005/0005109 A1* | 1/2005 | Castaldi | G06F 21/606 713/165 |
| 2005/0125739 A1* | 6/2005 | Thompson | G06F 3/0481 715/778 |
| 2005/0198292 A1* | 9/2005 | Duursma | G06F 9/54 709/225 |
| 2006/0008256 A1* | 1/2006 | Khedouri | G06F 17/30038 386/234 |
| 2007/0107048 A1* | 5/2007 | Halls | G06F 21/33 726/4 |
| 2008/0212945 A1* | 9/2008 | Khedouri | G06F 17/30038 386/291 |
| 2012/0311020 A1* | 12/2012 | Brown | G06F 12/0862 709/203 |
| 2013/0036190 A1* | 2/2013 | Serge | H04L 65/1073 709/217 |
| 2013/0151996 A1* | 6/2013 | Nario | G06F 9/445 715/760 |

* cited by examiner

METHOD FOR DOWNLOADING PREAUTHORIZED APPLICATIONS TO DESKTOP COMPUTER USING SECURE CONNECTION

CROSS REFERENCE TO RELATED APPLICATIONS

This application is a divisional of U.S. patent application Ser. No. 13/939,295, filed on Jul. 11, 2013, incorporated herein by reference.

BACKGROUND OF THE INVENTION

Field of the Invention

The present invention relates to a method for downloading server applications to a desktop computer using credentials of a mobile device with minimum possible errors during authorization and passwords (certificates) generation. Also, the invention relates to a method for establishing a secure connection for downloading applications to a desktop computer.

Description of the Related Art

Typically, a mobile device user wants to download and install software applications from a content server to a desktop computer of other device associated with the user. However, the connection may not be secure, and some personal data can be intercepted and stolen. In a conventional scenario, a user downloads application software from the server and enters his registration data and a serial number (key) of the application software on the desktop where the application was downloaded.

The mobile user has to remember his login and password for connecting to the server and/or activating software on the desktop. A software distributor verifies the validity of the provided information and registers the software on the desktop computer. A provider can install a secure data (such as a digital signature key) on the desktop and associate the key with the account of the mobile device user, but this action requires sophisticated handshaking procedures.

In a conventional scenario, the server software is verified and installed from the package. This process has to be repeated each time the user wants to install a new software application. The signed software guarantees that it was issued by a trusted source only and, typically, has no user-defined data. The server software has to be installed on the desktop, and, then, credentials should be created for the server. The credentials for accessing the server software from the client's software on the host should be derived from an appropriate security database known to the server.

This conventional method requires the user to memorize or securely store his registration data and, then, enter it each time the user wants to download and install the server application. The user can forget or confuse the registration data, which can result in errors and failed installations.

Accordingly, there is a need in the art for a simplified installation method and reducing errors during authorization and password generation for the downloadable application software. Additionally, there is a need in the art for establishment of a secure connection for downloading custom application software to a desktop computer.

SUMMARY OF THE INVENTION

Accordingly, the present invention is directed to a method for simplifying the application downloading process, and more particularly, to minimization of errors during the authorization and password generation when a user downloads the server applications on his desktop or on the server associated with the user that substantially obviates one or more of the disadvantages of the related art.

According to the exemplary embodiment, a downloadable application has embedded user credentials. In one embodiment, an API access key can be used (such as a temporary hash sequence), which maps into appropriate account on the service. One API access key is passed to a download link as an argument. Since download occurs via https, the approach is secure. Then, a secure connection to the data server is established before the user downloads custom server software and installs it on his associated server or a desktop computer. According to another exemplary embodiment, a method for secure download of third-party applications received from a provider, who does not have an authority for signing the application package is provided. A user downloads a digitally signed application and enters his data, for example, an email address or user name and an associated password.

A vendor (or a content provider) checks the validity of the user data and registers the application and desktop as associated with the user. In the exemplary embodiment, only the application provider and not the vendor has a right to digitally sign the package. In this context, the vendor represents as content provider—in other words, the vendor provides packages from its servers. However, the vendor is not necessarily the source of the content itself. The content source is responsible for digitally signing of its application package. The proposed method of storing credentials in a package permits injecting the credentials without package source's signature and without corruption. According to the exemplary embodiment, the functionality of the system is provided by connecting the devices authorized by the same user.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 1:
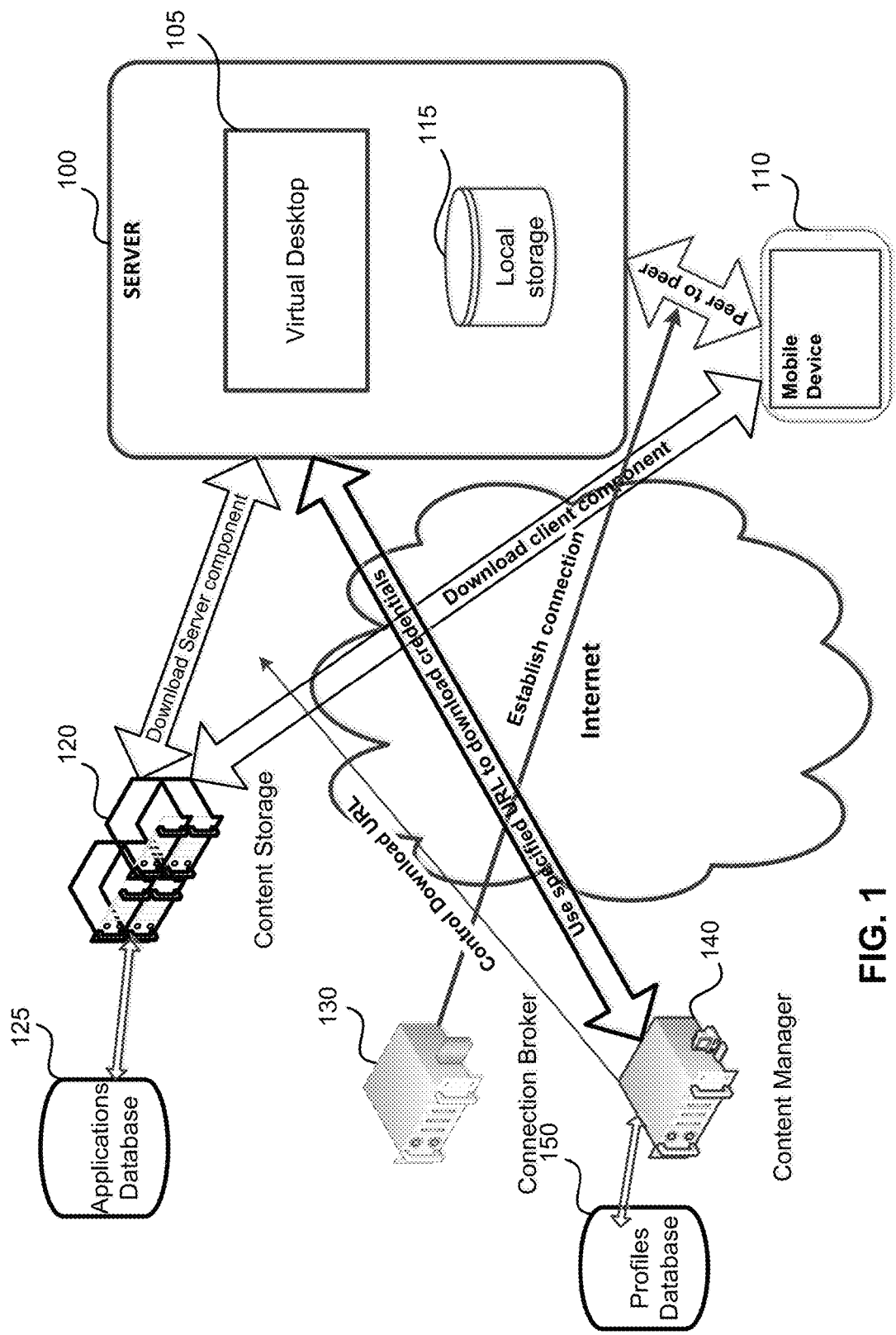
FIG. 1 illustrates a general architecture of a system, in accordance with the exemplary embodiment.

DETAILED DESCRIPTION OF EMBODIMENTS
OF THE INVENTION

Reference will now be made in detail to the embodiments of the present invention, examples of which are illustrated in the accompanying drawings. According to the exemplary embodiment, a custom package configured for a particular user account should be provided. In MS Windows™ it can be implemented by using an identification user token included into a portion of the .exe file, where the token is not protected by a digital signature. The token does not need to be protected, since it is a temporary mapping into real user. For example, a file can have a digital data and a digital signature (hash) for that data where the hash can be located at the end of the file after the bytes indicating the end of the file. It is implemented by using the file's real size that is larger than the indicated file size, since the file resides on the disk with a fixed size of clusters. The unused space of a cluster(s) can be used for writing required information.

According to the exemplary embodiment, the digital signature is placed at the end of file where the file length is specified by metadata in the beginning of the file and the data placed after the digital signature is not used by a hash function of the digital signature calculation. Thus, the length of the file may be increased and special auxiliary data is written into an empty file space. If the *.exe file is executed, the data located after the digital signature is ignored and may be used by a specially designated procedures only, such as a product installation procedure. A token integrated into an application package can be used to configure host agent against PAX service. For example, when the user asks to start the installation and activation script, the script parses *.exe file, recovers auxiliary information if any or searches for associated URL (if any), and then loads credentials required for script generation and execution. When starting execution of an *.exe file or similar, nothing unusual happens with auxiliary data.

In MAC OS, a special link from the quarantine is used. The link is used for indicating a place from where the file is downloaded. In most cases, it is useless information, since the link is deleted after expiration of a quarantine time. If the file contains a malware, the link is used for statistics and blocking of the sender. The link is stored as additional file attributes and "lives" there as long as the file itself is used. The product installation procedure can use it just once. In one embodiment, after a single attempt of use deploy id on service, the link becomes invalid. The same can happen with links embedded into *.exe file for Microsoft Windows. According to another exemplary embodiment, a method for secure downloading of third-party applications received from a provider, who does not have an authority for signing or even updating the package, is provided.

In order to connect a user-associated server or a desktop computer to a mobile device, the user should load the server software to the desktop and register the software as associated with his account or a mobile device. The user connects desktop computer to the server and uses a mobile device to connect to a Credentials Manager to allow content storage to work with the user credentials, while the executable software is downloaded to and installed on the desktop. As another option, it is possible to connect everywhere from the desktop. To connect the desktop to the CM effectively, user credentials ar used. The simplest way is to use the credentials from the MD. Note that it is possible to connect to the CM from the desktop directly, but the desktop should be authorized, which is a separate task.

Thus, the user issues a request to download a digitally signed application and enters his data (i.e., for example, an email address and an application serial number). A vendor checks the validity of the user data and registers the application to the user. In the exemplary embodiment, the application provider has no right to digitally sign the package and uses an already signed package. According to the exemplary embodiment, the functionality of the system is provided by connecting the devices authorized by the same user(s).

The authorization codes cannot be embedded into an installation package since the package has to be signed before authorization codes are generated. In theory, there are many users/accounts and it is impractical to create a large number of preconfigured packages. Thus, deploy ID's have to be injected on the fly before or during package download. Note that the service provider has no key to sign the data. However, after the installation, an authorized script can be launched on behalf of the user to simplify the installation and registration procedures. This script activates logins, passwords and keys on behalf of the user. The script is installed during service deployment. Specific installation procedure can generate the script depending on the OS and user settings. For example, the system can ask "are you sure" at various points in the installation procedure. The user can confirm with a "yes", or he can fill out forms and check boxes without additional steps, as long as the user and the system trust the script generator. The script acts on behalf of the user, using the user credentials (an exemplary method is disclosed in U.S. Pat. No. 8,307,358, incorporated here in its entirety).

Usually, the user accesses his personal "office" on his computer, where the user can select, customize and install an application that is distributed as a signed package using the secure channel. The secure channel is established using the authorization data, which is entered previously. The script acts as the user and does everything required for installation and activation of the server application downloaded under the control of the user executed from the mobile device.

The user of a mobile device is already authorized and can monitor and control important steps of downloading an installation of the application package on the desktop. The user typically would use the same credentials on the desktop as were used on mobile device. In other words, the objective is to authenticate application on the desktop under the same account as was used on mobile device, without the necessity for the user to enter credentials on the desktop. The user also can select required settings with the help of the configuration masters either on the desktop computer or on the mobile device. Since the mobile device is more secure, the more important desktop authentication and logging into user's account can be performed using mobile device. Note that it is easy to deactivate a compromised device. The MD can have a lot of secure protections, which cannot be accessed one piece at a time. For example, keys embedded into a SIM card cannot be read and recovered. They are in a sense hardware protected and may be used with that SIM card only. The less important aspects of the operation, such as a disk partition where the application data should be stored, can be controlled from the desktop.

According to the exemplary embodiment, the user can check and approve the desktop for package installation and, then, control the process from the mobile device. As an example, the desktop connects to a communication broker.

The broker transmits to the desktop a random text string and the user enters the same text string to show the communication broker the desktop for package installation. Here, the user can read the string from the desktop screen and enter the text (text may be in form of a "captcha") at a predefined time. Desktop IP address or other ID can be used for this purpose.

Another authorization procedure that can be used is described in US Provisional Patent Application No. 61673277, Filed Jul. 13, 2012, entitled METHOD FOR WIRELESS DEVICE AUTHENTICATION, incorporated herein by reference. The settings selected on the mobile device are recorded and the configuration data package is formed. The package should be in a form readable by script generator. The package can be protected by encryption with a key pair previously distributed to the desktop. The configuration data package cannot be distributed (attached) with the application, because a digital signature can be corrupted, and is distributed separately. Other configuration data can be embedded into the configuration data package, e.g., user preferences-related data for the particular user (e.g., a wallpaper color schemes for all the user's devices). This data can be received from the cloud where it was previously backed up.

In one embodiment, a single account on the desktop can be accessible by multiple users. The first user employs an unattended installation procedure and the other users enter the real credentials. In another embodiment, when an unattended installation is used, the server software is associated with one desktop account only. If the user wants to install the server software for all of the accounts on the desktops, the unattended installation is automatically disabled. The script to install a package runs on the desktop as if a live user controls the installation on the desktop.

Accordingly, the software is distributed along with the auxiliary data (i.e., the configuration and the authentication data). This data can be used for software configuration and/or for a system setup where the user's credential are required. It can also be used to generate a digital signature for further authorization. In one embodiment, the key of the digital signature is provided as a part of the installation package, which does not affect the digital signature of the package. User credentials (API access key) are integrated into the part of installation package not protected with digital signature. The signature can occupy an unused space. The signature can also be embedded in the package as a "watermark."

The key of the digital signature can be included into a free space of a general purpose container. In one exemplary embodiment, the key can be divided into parts and the parts are placed into metadata fields (each metadata filed has a length smaller than the length of the key). Note that the proposed method, advantageously, provides for downloading of the keys.

According to one exemplary embodiment, the installation package is received from trusted sources (i.e., such as, for example, a software vendor or an authorized distributor) and is downloaded to the user desktop from the provider's portal. According to one exemplary embodiment, a user needs to transfer credentials to the vendor from the mobile device for downloading a package to the desktop. The software vendor forms and optionally signs an installation package customized for a particular user. Thus, the package can have two signatures—one from the software developer and one from the service provider. The software developer's secret signature key may be generated by him when generating the key pair. Then the public key may be given to a certificate authority. Then any person can check signature validity using certificate authority. The same procedure can be implemented by a service provider. In one embodiment, the user device OS does not allow for unsigned packages or packages created for other users. In this scenario, the additional data is generated by a service provider and packed into the data block accessible by a URL, where the URL corresponds to the URL from where the application is downloaded.

According to the exemplary embodiment, a virtual URL is used. The virtual URL can be used by the OS for estimating reliability of the source of the application. The source of the downloadable application can be recognized and the installation package and the application are placed into a quarantine indicating the source of the download. The virtual URL is a reference (link) to a non-existent page. The content server intercepts the virtual URL, processes it using, for example, ASP.NET and returns the required data to the user. For example, a user can subsequently download a server application and the package needed for launching the application from the same URL (source).

A virtual URL, in the context of the application, is a link to a non-existent or temporarily available resource. The virtual URL user can connect to the service provider, where a required data is generated using this URL. Optionally, some user's credentials may be either added to or embedded into the URL. The URL contains deploy ID as an argument or as a part of address. Since the sender's URL is used in TCP protocol, the corresponding data can be generated. According to the exemplary embodiment, a virtual URL does not correspond to a resource on the server and is used as a command instruction to generate data corresponding to the URL known to the receiver only. The URL is generated and transmitted to the user and then the URL is used to generate data delivered to the desktop, but the provider has no data blocks with a corresponding URL. The user uses the URL provided by the service to download the application. The downloader service processes content of package using, e.g., SSI technology and replaces a marked part with the deploy ID. A part of URL and/or an argument(s) of URL may be used for desktop identification, then user identification and then credentials generation. Alternatively, a package with credential may be generated during a session of mobile device activity (or any time).

Subsequently, the user employs the URL for downloading a digital signature or some other identification data. According to the exemplary embodiment, a URL can be active during a user session in the user personal office started from the mobile device. When the server uses the URL and tries to register into the user's account, the user can see registration notification and other actions on the mobile device, and can accept them. If the session from the mobile device is terminated, the URL may become invalid. Then, the user can gain access to the server using the client application on the mobile device using the registration data of the server. Subsequently, this data can be used to access a corresponding host.

After receiving the key and other data required for the script execution described above, the user can simply complete the installation of the application from the installation package. Thus, the user acquires the rights to access the protected data. In one embodiment, the protected data contains remote access rights from a user mobile device to a user computer. Since the mobile device has a large number of identification and authentication protections, downloading of a client application onto the mobile device does not requires user authorization steps, as for activating the user personal office on the desktop (server).

Accordingly, the user identification can be performed based on a unique mobile user number or a user identifier from the mobile device, and if the user is certain of the desktop where the software is downloaded to, is identified properly, the desktop can be used as well. A mobile device has a number of security passwords, including protected access to the Iinternet, access to paid services, etc. When users use a master password to access different services, it can simplify the process of accessing the different services. The master password can improve the security of the implementation, because the master password can be used for a single device only. This simplifies the procedure but may compromise a level of security. If the user always uses auto-filling, for example, the level of security is increased. If the user remembers all the passwords, then it is reduced.

In the exemplary embodiment, the single device is a mobile device. A master password is a password for accepting any auto-filing security data on the mobile device. The data may be, e.g., login/password pairs or the like for various services, such as a master password in response to a prompt "please, login using Twitter or Facebook" If the user has an active session with a corresponding service (Twitter, Facebook, mail.ru, etc.), the session keys may be used to authenticate the user to other services. A mobile phone also has hardware protected unique IMEI. The SIM card has a unique phone number or user ID and several levels of security protection, including an embedded digital signature. All of this data and procedures make the phone unique and highly protected, and if the phone is stolen or lost, the server can block associated credentials completely in a simple manner. For example, the network connection from the apparatus with a blocked IMEI may be completely prohibited in a particular geographic territory.

FIG. 1 illustrates a general architecture of a system, in accordance with the exemplary embodiment. The following definitions are generally used throughout this description:

CB—Connection Broker 130 allows to download the requested data and establishes peer-to-peer connection between the server 100 and the user mobile device 110. The CB 130 can change the package title or create and support a URL that is required for installation and activation of the server application on the desktop;

MD—Mobile Device 110, user's personal mobile device (e.g., a smartphone or a tablet) that contains an application and a hardware that can be used for user's authorization in the network and from where the user intend to connect to the desktop;

CM—Credentials Manager 140, a server that manages user profile data 150. The CM 140 can access the user credentials database and manage user profiles 150. For example, it can manage user desktop 105 keys required to access the desktop from the MD, specifically, to identify and authorize the desktop. According to the exemplary embodiment, a virtual desktop can be implemented according to the user's mobile device requirements, including translation of the phone buttons to the desktop keyboard keys, themes and resolution of the desktop graphics, etc.

CS—Content Storage 120 is used for storing an application database 125, where applications may be the server 100 components required for downloading to the desktop. The applications are not user-specific and require further tuning for installing and activation.

According to exemplary embodiment, in order to connect the mobile device 110 (a client side device) to a server 100 (user virtual desktop), the mobile user has to employ an application downloaded only from a trusted source (125). Then, the mobile user 110 must complete authorization with the server 100, which also has application downloaded from a trusted source 125. In most cases, the same user account can be used for downloading and installing the server applications on the server 100 and client application on the mobile device.

The user initially may have a login and a password ("Personal Office" login and password) or other data required for secure connection for using the services via a connection broker 130. Also, some secret keys are used for protecting against interceptions of the traffic on the connection broker 130 side. The connection broker 130 checks the activity of the user account by asking the credentials manager, and either grants or denies connection supported by a connection broker. The connection broker 130 can operate as a proxy server or it can provide a peer-to-peer connection without using external IP addresses by both desktop and mobile device. Personal office 105 login and password can be used for connecting the mobile device 110 and the server 100 to the connection broker 130.

According to the exemplary embodiment, the unique keys are used for data exchanges in an authenticated or in non-authenticated modes. In an exemplary embodiment, a dropped connection can be restored as if it were not interrupted as it is disclosed in U.S. patent application Ser. No. 12/340,903, Filed Dec. 22, 2008, entitled ACCESSING A REMOTE VIRTUAL ENVIRONMENT WITHOUT USER AUTHENTICATION, incorporated herein by reference. The connection broker 130 establishes peer-to-peer connections, since the mobile client 110 and the server 100 may be not accessible from the outside. In partial embodiments the connection broker is not required.

According to the exemplary embodiment, a user has a mobile device account and the applications are loaded from an app. store to the mobile device. In this embodiment, an application with custom user credentials cannot be created and modified, since it can be downloaded from the single source (app. store) only. Here, the connection broker using user credentials replaces the original URL of the application with a virtual one for further downloading data required for installation and activation from the same URL. Here, the user accesses the unique URL given by the connection broker. The URL may contain the user's unique mail address as an argument. A unique random data sequence or mail address hash may be used also. The content manager checks if the URL is used for the first time, asks the mobile device if the desktop is an authorized desktop and uploads server software package to desktop. The desktop receives the package and stores the URL as a non-trusted URL. When the installation engine or script generation procedure uses the same URL the next time, the connection broker or another part of service provider knows that the URL was already used and transfers to the user credentials required for application activation and installation.

In another embodiment, a server component can be installed only if it is digitally signed. Thus, a special custom application with additional data is created while the digital signature is preserved. The additional data is created outside of a signed package with embedded data placed outside of the area used for the signature calculation.

For MICROSOFT WINDOWS, the small amount of data defining file size may be placed into a special area of the file and does not affect the digital signature. Further the additional space of the file can be used for placing auxiliary data. The information may be specific credentials or URL, e.g., a virtual URL where user specific data can be downloaded further. In case of MAC OS, a special URL for downloading the application is created. The URL is unique for each user and has a short life span. The typical life span time may be a time required for package unpacking and installation or while the session of the connection broker with the mobile device or the mobile device with the desktop is active. Other options are also possible. Connection broker can check the geographical area of the desktop, to ensure that both requests come from a place, also the Internet provider IP address of the desktop may be checked.

In one embodiment, the installation requires rebooting of the host. The current session is disconnected and the connection to the server where the package resides may become useless. In this case, the user can use an auxiliary data to later re-establish the connection and activate the application. Note that the URL or additional user data are created only for the user personal office after the package is downloaded from the server.

According to the exemplary embodiment, a user wants to download a custom server application to his desktop 100. When the application is installed and activated on the server 100 it should be configured and activated to enable communication with the user's mobile device as a trusted hardware module. It should be noted that initiator of the communication is usually the mobile device, but connecting to a fake device under the guise of the user's remote desktop may result in a security violation, such as stealing personal data and so on.

Thus, the remote access of the user from his MD 110 to the server 100 should be protected. Since the MD 110 has identification and authentication protection, the user can use only MD as a trusted communication device. Hardware desktops have many IDs that can be changed or fake IDs can be used. Some Internet providers allow Internet access to registered MACs. To overcome the problem, fake network card MAC addresses are usually used. Network address translation (NAT) software may replace a lot of data in the IP packets, if it knows what and how should be replaced.

For example, MAC addresses of network cards can be changed, protected passwords can be stolen and used on other desktops. The user can be authenticated by the unique serial number of his MD 110 or by the mobile service provider identification of this user. To protect the MD from unauthorized usage, the user can use a password protection (e.g., gestures for unlocking the mobile device). Additionally, the user can lock the SIM card or the IMEI number if the phone is stolen. Thus, the use of the MD for allowing secure operation during configuration of the MD-desktop pair is required, if the user wants to avoid using credentials from the desktop.

According to the exemplary embodiment, a user has to open the login page to get into his account from the MD. Since the MD can use password auto-filing, it is not a problem for the user. Meanwhile the user can connect the server 100 to the CB 130. The CB 130, through an agent, connects to the CM 140 and checks server's role and user credentials received from the MD. The agent can be stored and executed on the CB 130. If the user data is found in the CM server's local database 115 and is verified, the user can download the server application package with the embedded auxiliary data. The user can load user's credentials in a form required for activating the user's profile on the desktop, such as API access key or deploy ID (e.g., a randomized hash) which is mapped into appropriate user account on PAX service side. The main purpose of CB 130 is to establish a connection between the MD 110 and the server 100.

Figure 2:
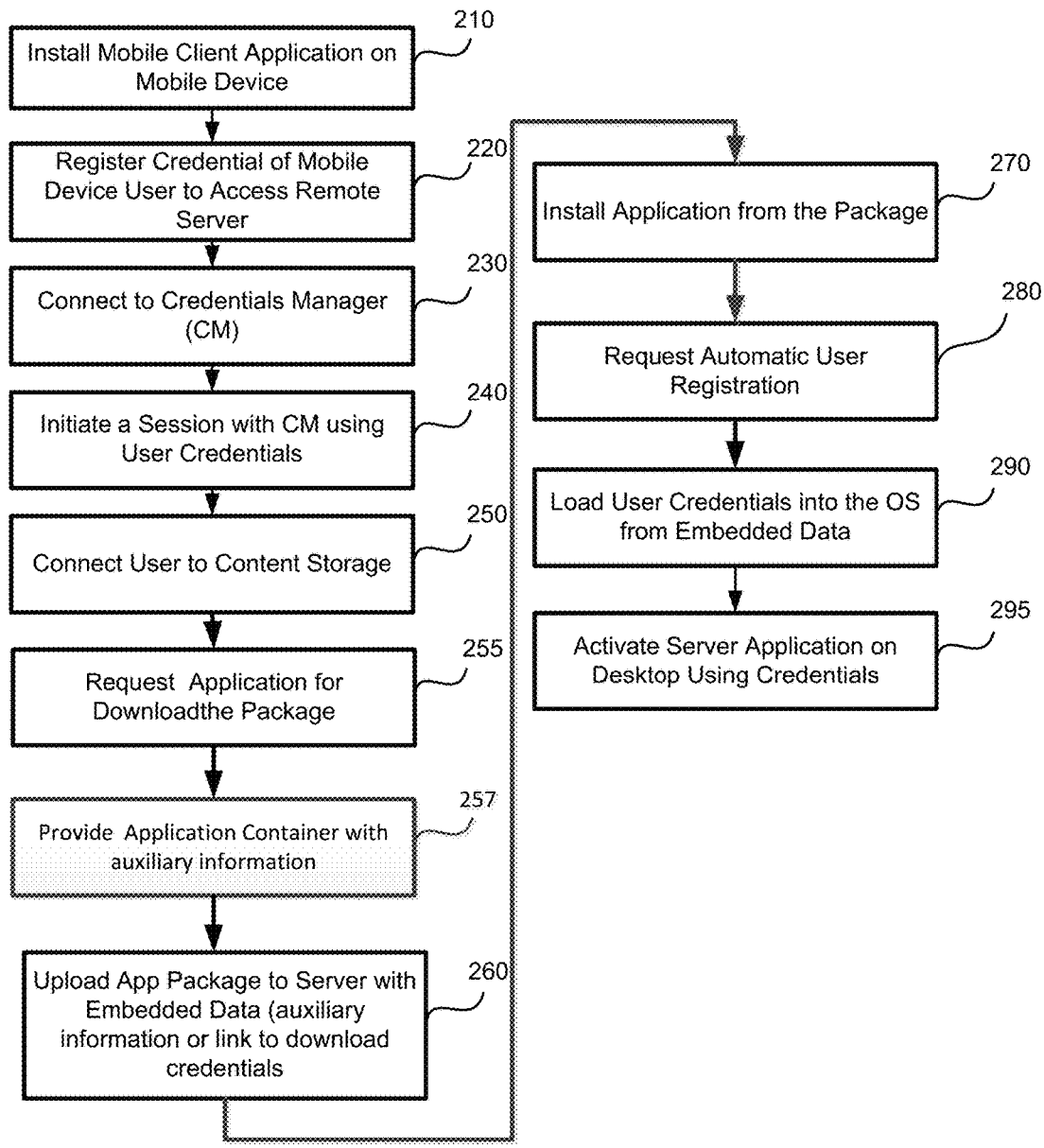
FIG. 2 illustrates a flow chart of a method for launching a server application on a desktop using a mobile device, in accordance with the exemplary embodiment.

FIG. 2 illustrates a flow chart of a method for launching a server application on a desktop using a mobile device, in accordance with the exemplary embodiment. In step 210, the user connects to the CM using the browser on the server (desktop) and optionally installs client application on the mobile device for the content manager. In step 220, the user uses his credentials to establish a session from the MD with the CM. In step 230, the mobile device is connected to the CM. At the same time (step 230), the user connects the desktop (the server) to connection broker for further connecting the desktop to the content storage. The session is initiated using mobile user credentials and approving from the MD of establishing session of the desktop with the CM in step 240.

In step 250, the CM connects the desktop to the CS. In step 255, the desktop requests the package with the server application and the data required for installing and activating the application. In step 257, the package is formed using corresponding software installed on any of the secure severs of the system. For example, the connection broker can prove that the desktop is approved by the user of the mobile device.

The connection broker can download the general server application and provide it with auxiliary information required for further activation. In step 260, an application package is uploaded to the server with the embedded user data for further downloading the user credentials. In step 270, the application is installed from the package on the desktop and, in step 280, the desktop starts the automatic registration. In step 290, the user credentials are loaded into the desktop OS using embedded (auxiliary) data. In step 295, the server software is activated on a desktop based on the user credentials.

Figure 3:
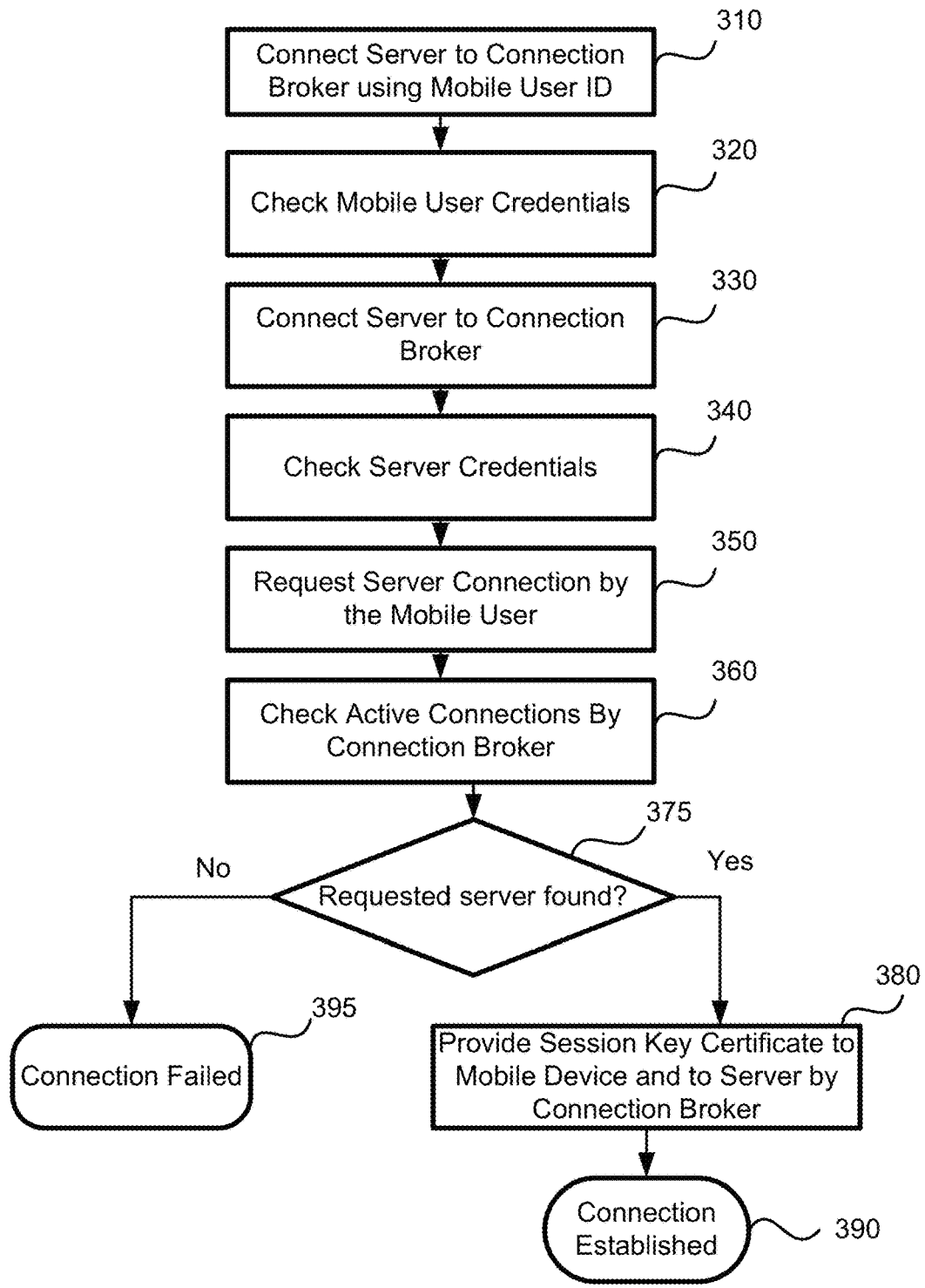
FIG. 3 illustrates a flow chart of method for establishing a secure connection between a mobile device and a server, in accordance with the exemplary embodiment.

FIG. 3 illustrates a flow chart of method for establishing a secure connection between a mobile device and a server, in accordance with the exemplary embodiment. In step 310, the MD connects to the CB using a client identification (or certificate). The user may use an application downloaded from the authorized (trusted) sources to connect to the CB. In step 320, the CB checks the user credentials. In step 330, the CB (through an agent) connects to the server and checks server credentials in step 340.

In step 350, the MD requests a connection to the server. In step 360 the CB checks the active connections. If the requested server is found in step 375, the CB provides the credentials with the session key certificates to the MD and to the server in step 380. In step 390, the connection is established. Otherwise, in step 395 the connection is not established and the MD user gets the message "Connection failed".

Figure 4:
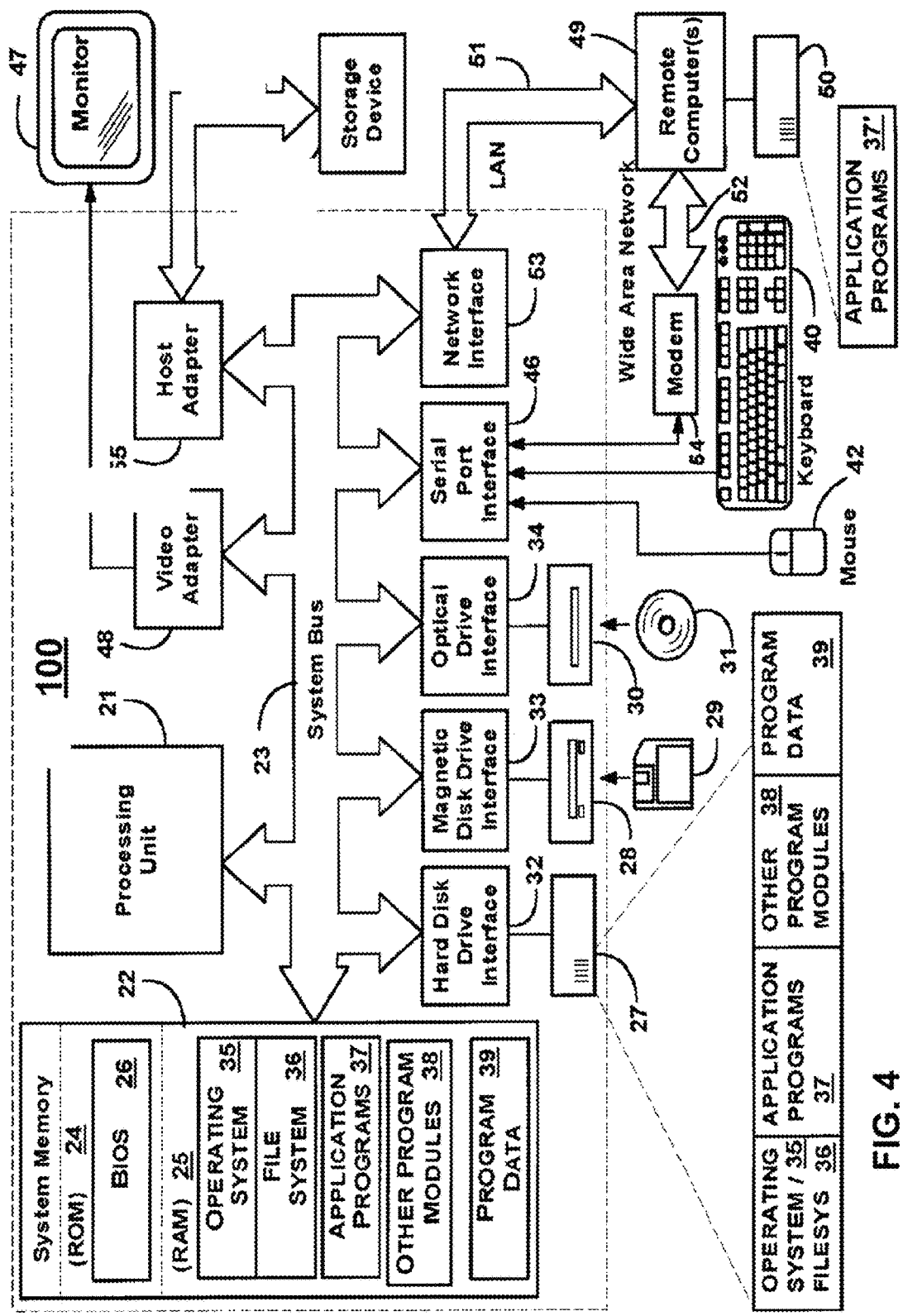
FIG. 4 illustrates a schematic diagram of an exemplary computer or server that can be used in the invention.

With reference to FIG. 4, an exemplary system for implementing the invention includes a general purpose computing device in the form of a personal computer (or a node) 100 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 100, such as during start-up, is stored in ROM 24. The personal computer/node 100 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 100.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 100 includes a file system 36 associated with or included within the operating system 35, such as the WINDOWS NT™ File System (NTFS), one or more application programs 37, other program modules 38 and program data 39. A user may enter commands and information into the personal computer 100 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 100 may operate in a networked environment using logical connections to one or more remote computers 49. The remote computer (or computers) 49 may be another personal computer, a server, a router, a network PC, a peer device or other common network node, and typically includes many or all of the elements described above relative to the computer 100.

The computer 100 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 100 is connected to the local area network 51 through a network interface or adapter 53.

When used in a WAN networking environment, the personal computer 100 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 100, or portions thereof, may be stored in the remote memory storage device. It will be appreciated that the network connections shown are exemplary and other means of establishing a communications link between the computers may be used.

Figure 5:
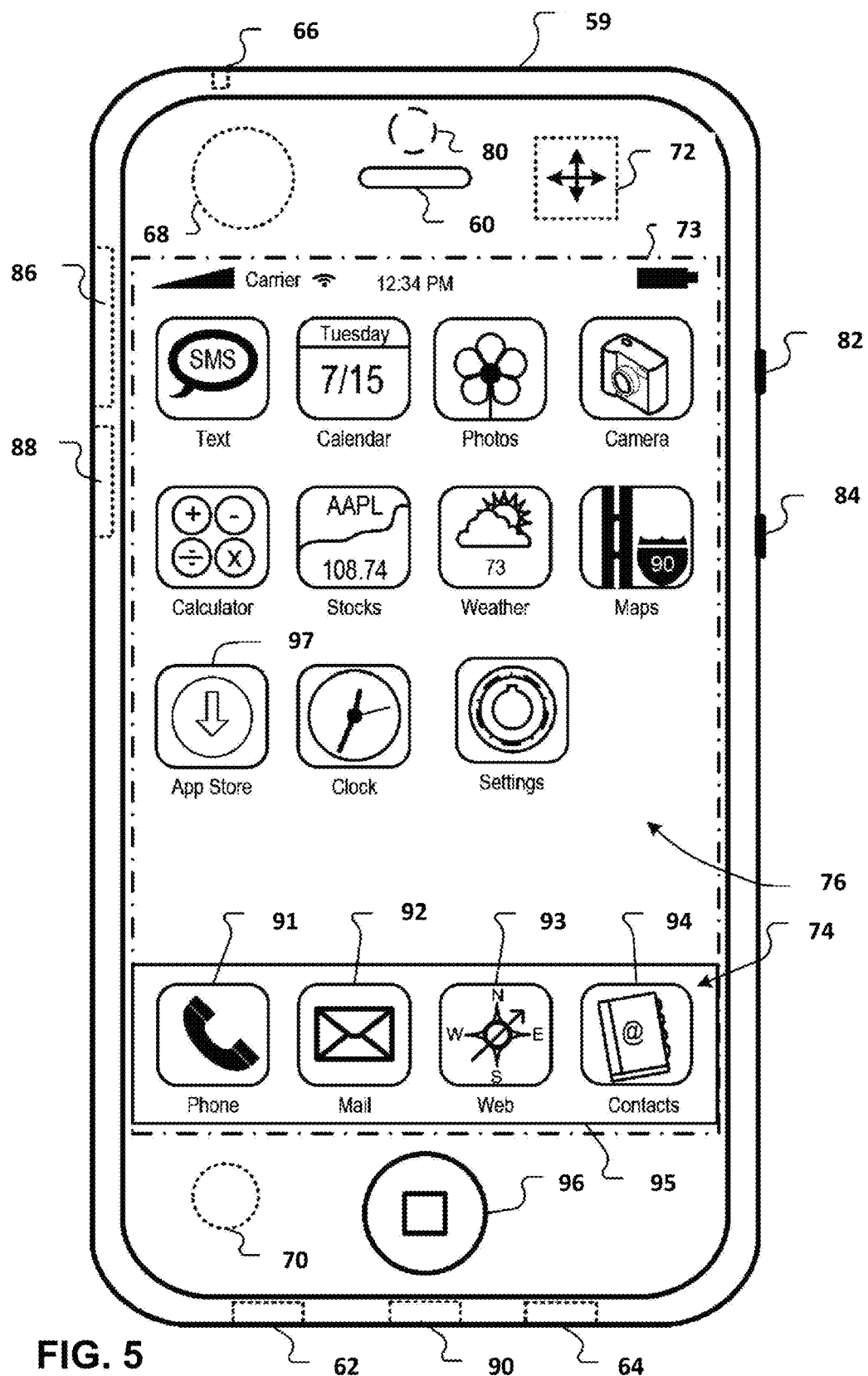
FIG. 5 is a block diagram of a mobile device on which the invention can be implemented.

FIG. 5 is a block diagram of a mobile device 59 on which the invention can be implemented. The mobile device 59 can be, for example, a personal digital assistant, a cellular telephone, a network appliance, a camera, a smart phone, a tablet, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality.

For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, functionality of each corresponding device may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 6:
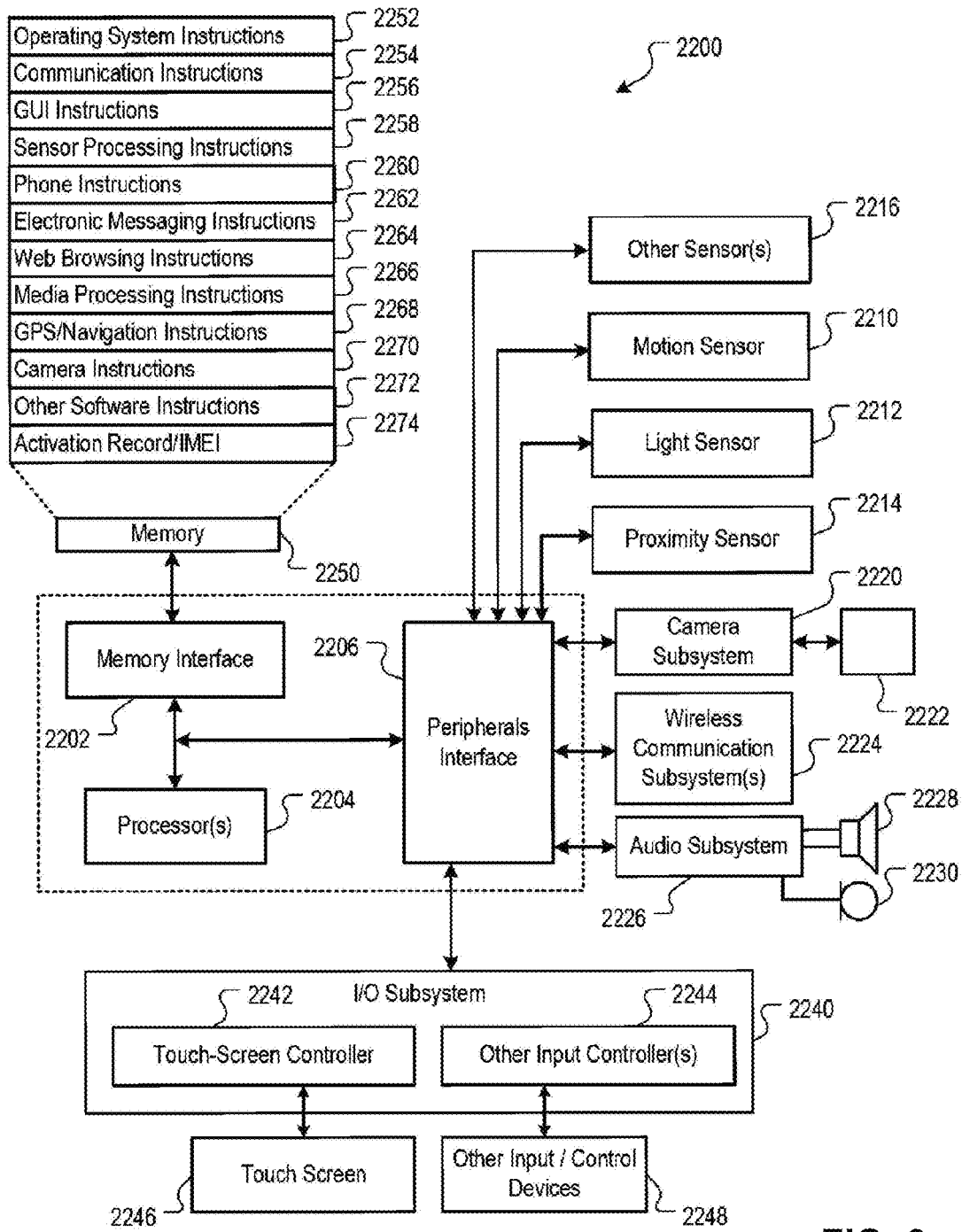
FIG. 6 is a block diagram of an exemplary implementation of the mobile device.

FIG. 6 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described the different embodiments of a system and method, it should be apparent to those skilled in the art that certain advantages of the described method and apparatus have been achieved. In particular, it should be appreciated by those skilled in the art that the proposed method provides for safe and efficient downloading of server applications to a desktop using mobile device.

It should also be appreciated that various modifications, adaptations, and alternative embodiments thereof may be made within the scope and spirit of the present invention. The invention is further defined by the following claims.

What is claimed is:

1. A computer-implemented method for launching a server application, the method comprising:
    (a) installing a mobile client application on a mobile device;
    (b) generating mobile user credentials;
    (c) registering the mobile user credentials with a virtual desktop for accessing a remote server;
    (d) establishing a session with the content manager from the virtual desktop using the mobile user credentials;
    (e) connecting the virtual desktop to a content storage using the content manager;
    (f) on the virtual desktop, requesting, from the content storage, a download of a server application package along with the mobile user credentials embedded into the server application package;
    (g) requesting an automatic registration of the mobile device user on the virtual desktop after installation of the server application package;
    (h) using the mobile user credentials, installing the server application from the application package on the virtual desktop;
    (i) loading the mobile user credentials into an operating system of the virtual desktop from the server application package; and
    (j) activating the server application on the virtual desktop using the mobile user credentials.

2. The method of claim 1, further comprising establishing a connection between the mobile device and the server by a connection broker.

3. The method of claim 2, further comprising:
connecting to the connection broker using a mobile user identifier;
checking the mobile user credentials;
connecting the server to the connection broker;
checking server certificate;
receiving a request to connect to the server from the mobile device;
checking active connections by the connection broker;
providing a session key certificate to the server and to the mobile device; and
establishing a connection between the mobile device and the remote server.

4. The method of claim 1, further comprising providing a login and a password to the mobile device by a connection broker for establishing the secure connection between the remote server and the mobile device.

5. The method of claim 1, wherein the connection is a proxy server connection.

6. The method of claim 1, wherein the connection between the mobile device and the remote server is a peer-to-peer connection.

7. The method of claim 1, wherein a credentials manager uses a URL to download the mobile user credentials.

8. The method of claim 1, wherein a connection broker establishes a secure connection between the remote server and the mobile device.

9. The method of claim 1, wherein a credentials manager manages the mobile user credentials and uses a profile database coupled to the credentials manager for storing the mobile user credentials.

10. The method of claim 1, further comprising downloading a server component application from the content storage.

11. The method of claim 1, further comprising downloading a client component application from the content storage.

12. The method of claim 1, further comprising activating the server application.

13. The method of claim 1, further comprising authenticating the remote server using the mobile device.

14. The method of claim 1, further comprising generating a script for activating the server application on the virtual desktop using the mobile user credentials.

15. The method of claim 14, wherein a network address ID of the script is embedded into the server application package.

16. The method of claim 15, wherein the virtual desktop activates the server application from the server application package using the script accessible using the network address ID.

* * * * *